June 29, 1965  G. M. DUNN  3,191,580
BIRD FEEDER
Filed March 12, 1964

INVENTOR.
GILBERT M. DUNN
BY
Pearson + Pearson
ATTORNEYS

3,191,580
BIRD FEEDER
Gilbert M. Dunn, 25 S. Main St., Penacook, N.H.
Filed Mar. 12, 1964, Ser. No. 351,371
6 Claims. (Cl. 119—51)

This invention relates to an improved bird feeder, especially designed as a feeding station for small wild song birds and from which large birds, such as pigeons, blue jays, crackles, etc., are excluded.

In our crowded urban areas, there is an increasing need to feed wild song birds, but many food donors have become discouraged by the aggressiveness, especially of pigeons, in taking food meant for smaller birds.

It is the principal object of this invention to provide a bird feeder with a domed or arched, roof which covers about twice the width of the seed hopper, so that the forward overhang of the roof, over the perch rail, makes access to the seed hopper by large birds impossible because of their weight, size and lack of perch footing.

Another object of the invention is to provide such a feeder which in normal position accommodates medium sized birds while excluding large birds, but which can be quickly adjusted to a more forward tilted attitude to increase overhang thereby accommodating small sized birds while excluding medium and large birds.

A further object of the invention is to provide an adjustable tilt, bird feeder having side walls and side wall brackets connected only by wood dowels of any desired length and a single sheet of semi-rigid, transparent plastic of any equivalent dimension whereby feeders of different lengths can easily be supplied by varying sheet and dowel lengths.

Still another object of the invention is to provide a simple, low cost bird feeder for small, wild, song birds in which a pair of mirror image side walls and three dowels form a skeletonized, knock-down frame and the arched roof, back, bottom, seed hopper and lower front are all formed by a single sheet of transparent plastic material.

A still further object of the invention is to provide a bird feeder with a single sheet roof, back and bottom seed hopper and a forward elongated feed opening, the overhang over the opening being increasable and the perch rod being retractable by changing the angle of tilt of the feeder on its supports.

Other objects and advantages of the bird feeder of the invention will be apparent from the claims, the description of the drawing and from the drawing in which:

Figure 1:
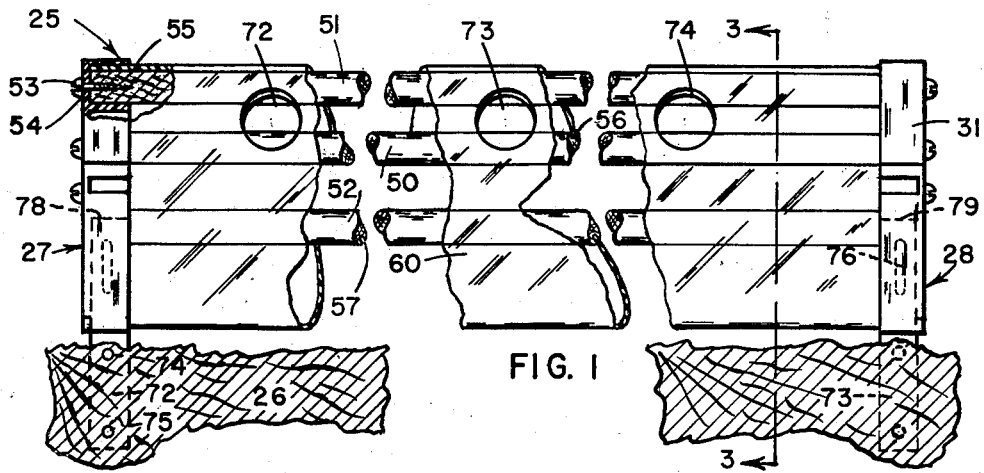
FIG. 1 is a rear elevation of a bird feeder constructed in accordance with the invention, with parts broken away for clarity.
Figure 2:
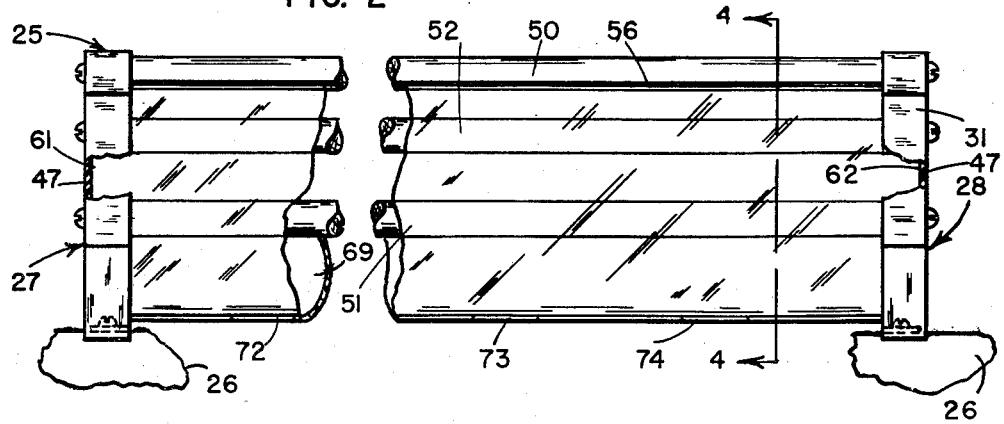
FIG. 2 is a plan view of the bird feeder of FIG. 1, but with the feeder in a different angle of tilt.

As shown in the drawings the wild song bird feeder 25 of the invention, is designed for mounting on a window-sill 26, although it may also be attached to a fence, porch rail or other structure.

The feeder 25 includes a pair of side walls 27 and 28, each the mirror image of the other, which may be made of any material, but which are preferably formed of plastic such as polyethylene of thin, substantially uniform thickness. Each side wall includes a flat, imperforate, portion 29 preferably of the combined curved and angular outline shown in FIGURES 3 and 4. An integral rim 31 projects inwardly from each side wall, commencing at the upper front portion 32, thence curving in dome, or arch, configuration over the top portion 33 in an arc of predetermined dimensions, thence curving similarly down the back portion 34 and then curving forwardly and upwardly at the bottom portion 35 to terminate in the lower front portion at 36. The rim 31 thus forms a shallow recess 37 while defining the front feed opening 38 in the unrimmed portion 39, located between the upper and lower front portions 32 and 36.

Each side wall 27 or 28, also includes at least three integral sockets 41, 42 and 43, sockets 41 and 42 being in the top portion 33 to seat suitable roof supports and sockets 43 being in the lower front portion 36 to seat a suitable perch rod, or rail. Preferably sockets 41 include a slot 44 facing rearwardly, socket 42 includes a slot 45 facing upwardly and socket 43 includes a slot 46 facing downwardly, for a purpose explained hereinafter. Preferably also, each socket is proximate the inner face 47 of the rim 31.

At least three rods, or dowels, 50, 51 and 52 are provided, each opposite end thereof being adapted to be firmly seated in one of the sockets of each opposite pair of corresponding sockets. The feeder is shipped in knock-down condition, and the rods, which complete the skeletonized framework, may be of any desired length depending on the length desired by the user. The rods 50, 51 and 52 may be of any suitable material but are preferably of wood, and each is detachably held in place in its sockets by the wood screws 53 which pass through suitable holes 54 in the flat portion 29 of the side walls into the ends 55 of the rods. The rod 50, which for convenience is called the front roof support rod, includes a full length kerf, or slot 56, which registers with the socket slot 44 and the rod 52, called a perch rod herein, also includes a similar full length kerf, or slot 57 which registers with the socket slot 46.

A single sheet 60 of thin, flexible, semi-rigid, substantially self supporting material, such as cellulose acetate butyrate, which may be about .020 inch in thickness and which is clear and transparent, forms the roof, back wall and bottom of the feeder. As in the case of the rods 50, 51 and 52, the sheet 60 may be cut to any desired dimension, lengthwise of the feeder, to permit a supply of various sizes. Each opposite side edge portion 61 and 62 of the sheet is in meeting engagement with the inside faces 47 of the rims 31 of the side walls and extends peripherally around the shallow recesses 37. The front edge 63 of sheet 60 is seated within the kerf 56 of rod 50 and passes through the slots 44 of sockets 41. The sheet then is curvilinearly bent to form the arched or domed, roof portion 64 of the feeder of predetermined dimensions and is then curvilinearly bent to form the back portion 65, bottom portion 66 and lower front portion 67. The other front edge 68 of the sheet is firmly seated in the kerf 57 of perch rod 52 and passes through the slots 47 of sockets 43. The sheet also passes along slot 45 of sockets 42 so that the rear roof support rod 51 serves as a ridge pole to prevent the collapse of the roof under the weight of a large bird, squirrel or snow. All of the feeder 20 is thus enclosed except for the front feeding opening 38. The bottom portion 66 is curvilinearly bent in an arc, about half the size of the arc of the roof, and forms a seed hopper 69, which is protected from the elements by the overhang 71 of the roof covering. A plurality of spaced apertures such as 93, 94 and 95 are provided in the back portion 65 of the sheet 60 to permit seed to be placed in the hopper 69 from the window side usually by means of a spout or funnel not shown.

A pair of brackets 72 and 73 are provided for the feeder 20, each preferably being a flat metal strip, for example of aluminum, having screw holes 74 and 75 and an elongated slot 76 therein for the mounting screws 77. The brackets 72 and 73 are mounted by screws 77 through the bottom portion so that the upper portions 78 and 79 are upstanding, parallel and free at the same distance apart as are the side walls 27 and 28.

Figure 3:
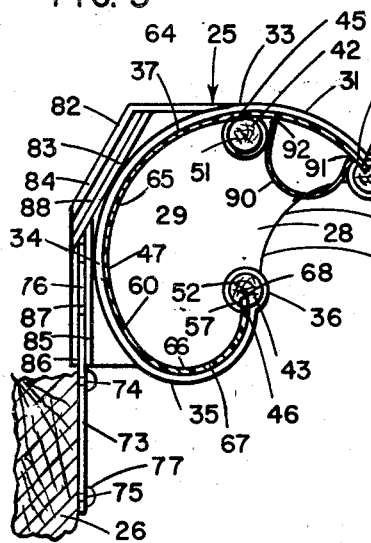
FIG. 3 is a view in section on line 3—3 of FIG. 1.
Figure 4:
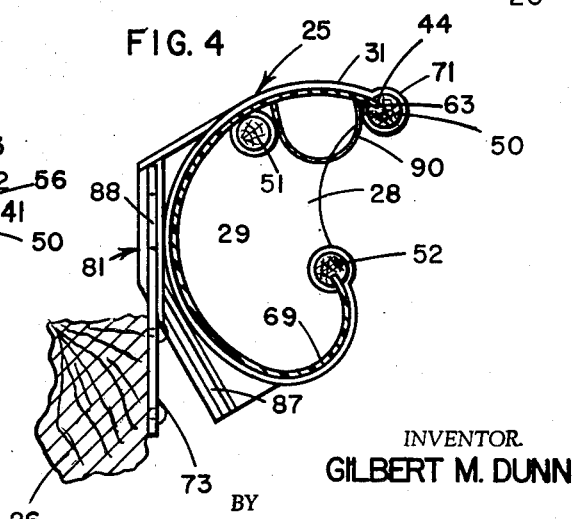
FIG. 4 is a view in section on line 4—4 of FIG. 2.

Adjustable attachment means 81 is provided on each side wall 27 and 28, as best shown in FIGURES 3 and 4. Each side wall 28 includes a portion 82 extending beyond and outside the rim 31 having at least two inwardly projecting, angularly disposed pairs of parallel elements, 83, 84 and 85, 86 forming at least two angularly disposed slots 87 and 88 for slidably receiving and seating a bracket 72 or 73. Preferably the slots are dead end, with the other end, and one side edge, open as shown. In FIGURE 4, the brackets are shown in slot 88 detachably supporting the feeder at the angle best suited for medium sized and small birds, with the overhang 71 and roof portion 64 covering the seed hopper and the vertical dimension of the feed opening 38 at nearly maximum accessibility. In FIGURE 3 the feeder is shown with the brackets 72 and 73 detachably seated in slots 87, the feeder 20 being consequently tilted forwardly and downwardly around its longitudinal axis to increase the overhang at 71 and decrease the vertical dimension of the feed opening 38. In this position medium birds as well as large birds are excluded and the feeder is usable only by small birds such as chickadees, due to its minimum accessibility to the perch rod 52.

It will be obvious that additional slots 87 and 88 can be provided to give a greater range of tilt angles, if desired. However, the provision of a second sheet 90, similar to the material of sheet 60, has been found to also serve as an excellent means for adjusting the size of opening 38, when the feeder is in either angular position.

The sheet 90 is co-extensive in length with sheet 60 and is inserted through the opening 38 in bowed, or arched, condition so that its front edge 91 is caught behind the rod 50 and its back edge 92 is caught in front of rod 51. The natural resiliency of the material maintains it in place and it serves to partially fill the opening 38 to block access to the seed hopper and perch rod by undesired sizes of birds. Depending on the width to which it is cut, it can block the upper quarter, third or half of the opening and is quickly removable when desired.

The sheet 60 being pliable and resilient can be easily snapped into place during assembly and can be equally easily removed for cleaning or replacement. The overhang of the roof portion at 71, makes it impossible for pigeons to alight on the perch rod and the domed roof portion tends to cause unwanted creatures to be unable to secure a foothold and to slide off the roof. When the sheet 90 has been snapped into place, the entrance head room is so controlled that large birds cannot perch with their heads inside the feeder and the overhanging roof, recessed perch rod and tight quarters makes it difficult for large birds to attain the necessary balance required by their large bodies. They thus fall away in defeat to make room for smaller song birds.

I claim:
1. A bird feeder comprising:
a pair of side walls, each a mirror image of the other, each having an inwardly projecting rim defining a shallow recess of closed curvilinear outline and each having three sockets in the inside face thereof at spaced distances therearound, proximate said rim;
three elongated rods extending between said side walls, each opposite end of each said rod being firmly secured within one of said sockets, two of said rods defining front and rear roof supports in the upper portion of said side walls and the third said rod forming a perch rod intermediate of the height of the front of said side walls;
a single sheet of semi-rigid, transparent plastic material having one end fixed to said front roof support, thence curved around the outside of said rear roof support, thence curved back upon itself to form a seed hopper and thence having its other end fixed to said front perch rod, the opposite side edges of said sheet fitting inside the inwardly projecting rim of said side walls and there being a space between said front roof support rod and said perch rod constituting a feed opening;
a pair of brackets detachably supporting said feeder on a windowsill, and
means on said side walls for selectively engaging said brackets in a first position wherein said front roof support rod slightly overhangs said perch rod with said feed opening accessible to medium sized birds and a second position wherein said front roof support rod considerably overhangs said perch rod with said feed opening accessible only to small sized birds.

2. A bird feeder as specified in claim 1 wherein said brackets are flat metal strips adapted to stand upright on a windowsill and said adjustable means comprises a pair of angularly disposed dead end slots on each said side wall for slidably receiving said strips, one set of slots supporting said feeder in medium bird position and the other set of slots tilting said feeder forwardly and downwardly into small bird position.

3. A bird feeder as specified in claim 1 wherein said plastic sheet includes a series of apertures intermediate of the height of the rear thereof whereby seed may be supplied to said seed hopper from the rear of said feeder.

4. A bird feeder as specified in claim 1 wherein said front roof support rod and the sockets therefor are slotted to receive the said one end of said sheet and said perch rod and the sockets therefor are slotted to receive the other end of said sheet.

5. A bird feeder as specified in claim 1 plus a second sheet of said plastic curved into arcuate form with the forward edge thereof detachably seated in rear of said front roof support rod and the rearward edge thereof detachably seated in front of said rear roof support rod, the bowed portion of said sheet partially filling the said feed opening to block access to larger birds seeking to alight on said perch rod to feed from said hopper.

6. A bird feeder comprising:
a pair of mirror imaged side walls each having an inwardly projecting rim defining a recess of curvilinear outline and each having a pair of angularly disposed dead end slots in a rearward portion thereof;
a pair of spaced apart roof rods, connecting the upper portion of said side walls and a perch rod connecting said side walls intermediate of the height of the forward portion thereof;
a single sheet of transparent, semi-rigid, plastic having its opposite side edges seated within said side wall recesses and extending in a curvilinear configuration from adjacent one of the roof rods rearwardly to form a roof, downwardly to form a back, forwardly and upwardly to form a seed hopper and terminating at said perch rod, and
a pair of strip brackets, each adapted to be mounted in upstanding position on a windowsill and each selectively positioned in either of the said angularly disposed slots in each said side wall for adjusting the tilt of said feeder.

References Cited by the Examiner

UNITED STATES PATENTS

| 291,030 | 1/84 | Clapper | 248—242 |
|---|---|---|---|
| 2,477,509 | 7/49 | Burgesser | 211—88 |

FOREIGN PATENTS

| 876,833 | 9/61 | Great Britain. |
|---|---|---|
| 908,565 | 10/62 | Great Britain. |

SAMUEL KOREN, *Primary Examiner.*

HUGH R. CHAMBLEE, *Examiner.*